United States Patent [19]
Whited

[11] Patent Number: 4,643,292
[45] Date of Patent: Feb. 17, 1987

[54] GRAIN CONVEYOR

[76] Inventor: Jerrel Whited, 2041 Crawford Dr., Walla Walla, Wash. 99362

[21] Appl. No.: 730,466

[22] Filed: May 6, 1985

[51] Int. Cl.$^4$ ............................................. B65G 47/46
[52] U.S. Cl. ..................................... 198/364; 119/52 B
[58] Field of Search ....................... 198/364, 637, 599; 119/52 AF, 52 B

[56] References Cited

U.S. PATENT DOCUMENTS

| | | | |
|---|---|---|---|
| 2,099,071 | 11/1937 | Lundbye | 198/364 |
| 3,590,983 | 7/1971 | Oury | 198/364 X |
| 4,213,525 | 7/1980 | Scheppele | 198/364 |

FOREIGN PATENT DOCUMENTS

| | | | |
|---|---|---|---|
| 557084 | 11/1943 | United Kingdom | 198/364 |
| 707872 | 1/1980 | U.S.S.R. | 198/364 |

Primary Examiner—Joseph E. Valenza
Attorney, Agent, or Firm—Paul H. Gallagher

[57] ABSTRACT

A grain conveyor for mounting at the top of a granary. It includes a main conveyor component having an endless belt extending the length of the granary. A plow is utilized for deflecting the grain from the belt laterally into bins in the granary. The plow is mounted directly on and supported by the trougher rolls that support the upper run of the belt, and is free of support by the main frame of the main conveyor component. The plow includes deflector means, for deflecting the grain, that is adjustable for deflecting a greater or lesser amount of grain to either side selectively.

4 Claims, 8 Drawing Figures

GRAIN CONVEYOR

FIELD OF THE INVENTION

The invention relates to grain conveyors for use in granaries. It relates particularly to such a conveyor located at the top of a granary, and running horizontally; the grain is deposited on the conveyor for example at one end of the granary, and carried toward the other end, and deflected laterally from the conveyor at various locations therealong into bins, and in that manner distributed along the length of the granary. The specific means for so deflecting the grain is known as a plow, and the present invention is more particularly related to such plow and its incorporation in the conveyor structure.

OBJECTS OF THE INVENTION

A broad object of the invention is to provide a novel grain conveyor and plow of the foregoing general character, and its mounting in the conveyor.

A more specific object is to provide such conveyor and plow having the following features and advantages:

1. The plow can be mounted in and incorporated in the conveyor substantially without modification of the conveyor for the purpose.
2. The plow is supported by and moves on the same trougher rolls that support the run of the conveyor that bears the grain.
3. The plow includes a deflector component that is adjustable for selectively deflecting more or less grain to either side of the conveyor.

DESCRIPTION OF A PREFERRED EMBODIMENT

Figure 1:
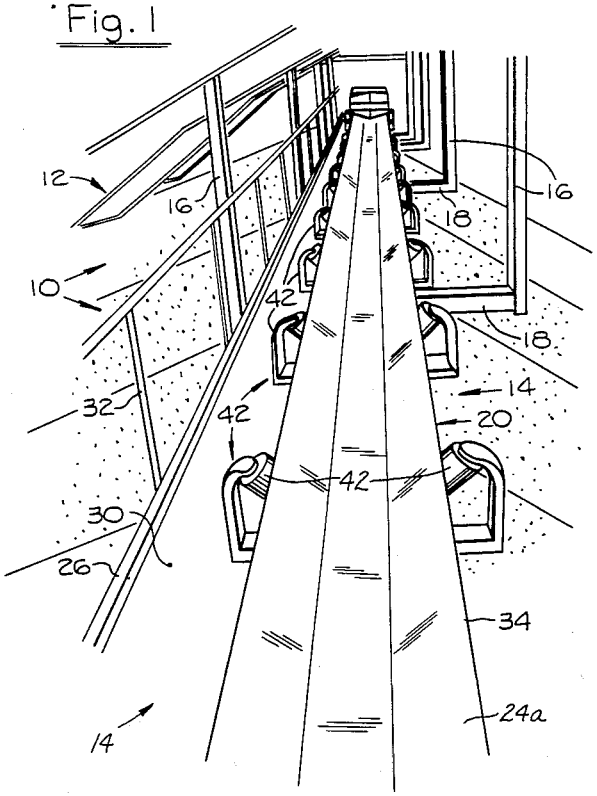
FIG. 1 is a perspective view of a conveyor component to which the plow of the invention is applied, this view being taken from the top of a granary.
Figure 2:
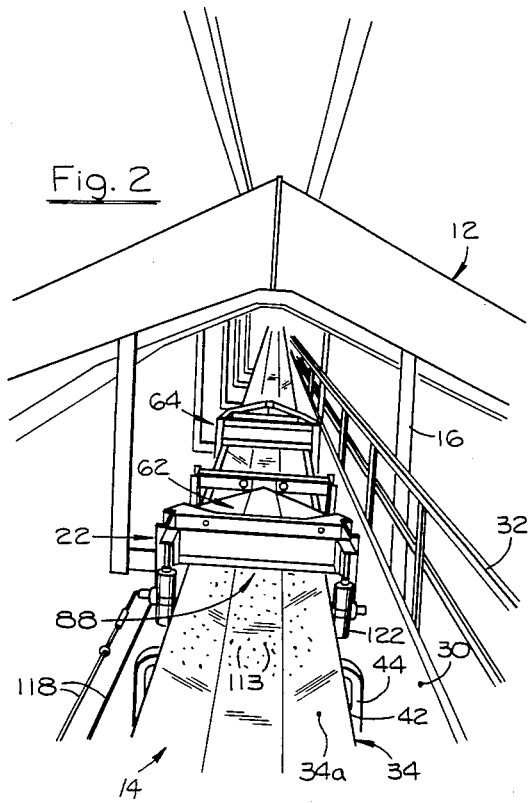
FIG. 2 is a view similar to FIG. 1 but showing the plow of the invention in the foreground.

Referring in detail to the accompanying drawings, attention is directed first to FIGS. 1 and 2 showing the conveyor of the invention, as a whole, and its position and environment in a granary. As a matter of general background, the conveyor of the invention is located at the top of a granary, and extends the length thereof. It is horizontally positioned, and grain to be put in the granary, is placed on the conveyor. The grain is deflected from the conveyor at desired location along the length of the granary and in that manner is distributed throughout the granary. The plow of the present invention is utilized for so deflecting the grain.

FIGS. 1 and 2 are perspective views from the top of the granary, above the conveyor, and looking down on the conveyor and the bins of grain. The granary is indicated as a whole at 10, having a roof structure 12. The conveyor is indicated in its entirety at 14 and is supported from the roof, by suitable means, such as hangers 16 and crosspieces 18 on which the conveyor rests.

The conveyor includes a main conveyor component 20, and this component is virtually unchanged from a standard conveyor heretofore known. As such it includes a main frame 24 (FIG. 4), which itself includes longitudinal rails 26 resting directly on the hanger crosspieces 18 and including the various structural pieces to form a complete and rigid and unified frame. The main frame may include other suitable and desired elements, such as a catwalk 30 and a handrailing 32. The conveyor includes a plow 22 constituting a major component of the invention.

Figure 8:
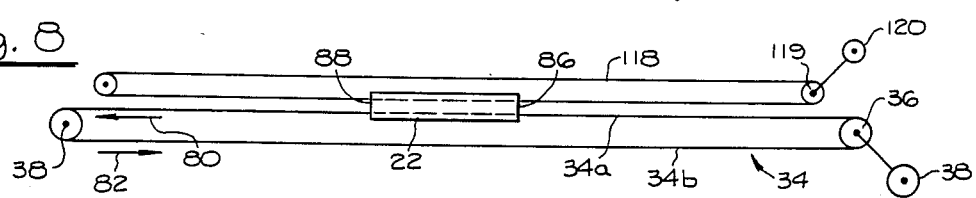
FIG. 8 is a diagrammatic view of the means for driving the endless belt in the horizontal conveyor component, and for moving or shifting the plow along that conveyor component.

The conveyor component 20 includes the usual endless belt 34 mounted on pulleys 36 driven by suitable power means 38 (FIG. 8). The belt includes an upper run 34a and a lower run 34b, supported normally in the usual way, but the support of the upper run is modified slightly by the plow of the invention as described hereinbelow. The lower run 34b of the belt rides on any suitable means (not shown) such as a platform supported by structural pieces 40 (FIG. 5) of the main frame. The upper run 34a is supported by trougher rolls indicated generally at 42. These trougher rolls are arranged in sets 42' spaced longitudinally along the main conveyor component (FIG. 1), and each set includes three individual rolls, namely, a bottom roll 42a, disposed horizontally, and end rolls 42b inclined at a suitable angle, such as in the neighborhood of 45°. These rolls are rotatably mounted in brackets 44 mounted on respective structural elements of the main frame, such as a cross piece 46 and uprights 48 mounted directly on the longitudinal rails of the main frame. The mounting of these trougher rolls is of known type, and serve to shape the upper run of the belt in a trough formation to hold the grain. FIG. 6 shows a special roll 50 mounted in a novel way to accommodate the movement of the plow along the main frame. The roll 50 includes a roll element 52 mounted on an arm 54 pivoted at 56 on a transferse axis in a bracket 58 of suitable structure mounted on the rail 26 of the main frame. This special roll guidingly engages the edge of the upper belt run 34a, in the troughed shape of the run, and therefore is at a suitable angle to accommodate the inclined edge of the belt run. This special roll can be pivoted about its axis 56 to lower it out of its normal upright position (FIG. 6) to a position clear of the movement of the plow along the main frame.

Figure 5:
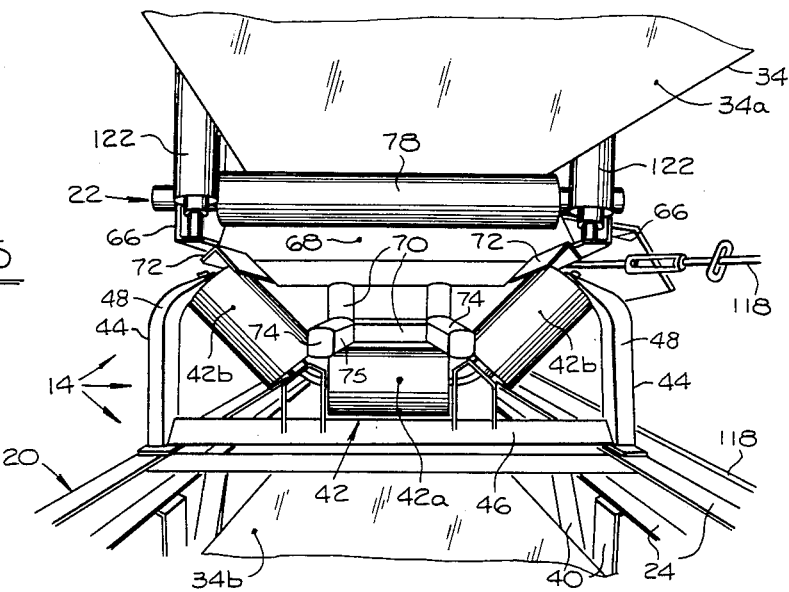
FIG. 5 is a transverse vertical sectional view of the conveyor, showing the plow and the main horizontal conveyor component.
Figure 6:
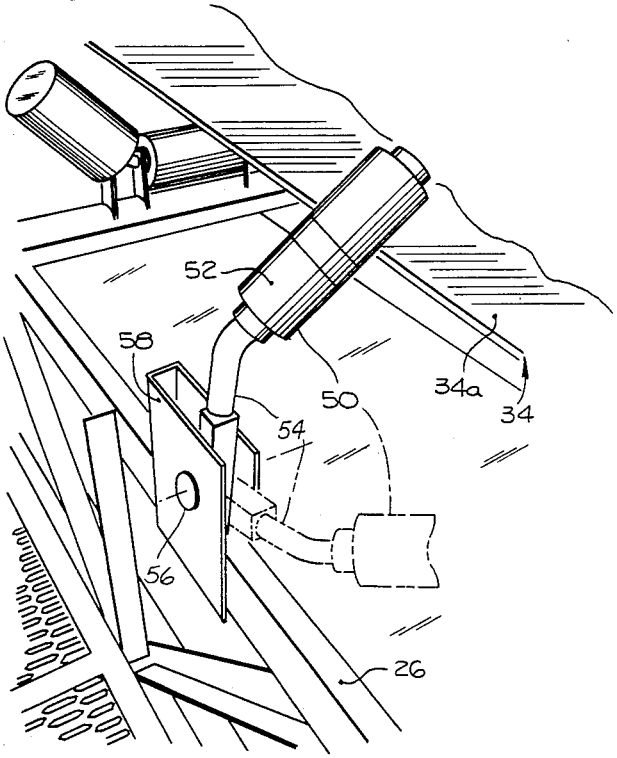
FIG. 6 is a perspective view of a special guide roll in the horizontal conveyor component.

In FIG. 5 the inclined trougher rolls are spaced from the bottom roll, and all lying in a common vertical axial plane. However, such trougher rolls may be of other specific forms, such as a structure wherein the end rolls are offset from the bottom roll, and overlapping it. In either case, the plow of the present invention is accommodated, and supported directly, by those rolls.

Reference is now made to the plow 22, itself as distinguished from the main horizontal conveyor component 20. A plow, as such, as stated above, has been used heretofore for the purpose of deflecting grain from the horizontal conveyor belt. In previous cases the plow was supported directly by the main frame, in a special and built-up arrangement specially made for that purpose. In the present instance the plow is supported directly by the trougher rolls, and for that reason the main conveyor component need not be modified or specially constructed to accommodate the plow; the special roll of FIG. 6 is considered an addition, and is not essential to the utilization of the present invention, and therefore may be omitted, at least in certain instances.

The plow 22 includes a plow frame 60 and two main components thereof, namely, a grain deflector 62 and a wiper 64. Such a deflector and a wiper, generally, have been known, but in the present case those elements possess novel features. The plow frame may assume any convenient structural form, and includes longitudinal side pieces 66 and various cross pieces which may be individually identified hereinbelow. One such cross piece is shown at 68 (FIG. 5) this being one of a plurality suitably spaced along the length of the plow frame. Each cross piece 68 includes a lower extension 70. Mounted on the cross pieces are rails engaging the trougher rolls and by which the trougher rolls support the plow. These rails include a pair of outer rails 72 and a pair of inner rails 74. The outer rails 72 are in the form of angle irons and positioned with their open concave sides directed downwardly. The inner rails 74 are preferably in the form of square tubes and form in effect bars. The outer rails 72 engage and rest on the upper circumferential edges of the end rolls and the inner rails 74 bear on the rolls at the junctures between the end rolls and the bottom roll. Preferably the inner rails 74 are of reduced dimension, or slightly tapered, as at 75 to facilitate leading those rails into the junctures between the rolls. These rails extend the full length of the plow frame and are of such length, relative to the spacing of the sets of trougher rolls (FIG. 1), that they rest on at least two sets of those rolls at all times.

In the use of the conveyor, the upper run 34a of the endless belt is lifted from the trougher rolls and fed or threaded through the interior of the plow. For facilitating this step, the plow is provided with transverse horizontal rolls 76 at the ends. The upper run of the belt then rides over these rolls and between the rolls it rests on what is known as a slider belt 78 (FIG. 7) in the form of a plate or a platform for supporting the run of the belt. Such a slider belt is known, and includes a special composition for minimizing friction with the belt.

Figure 3:
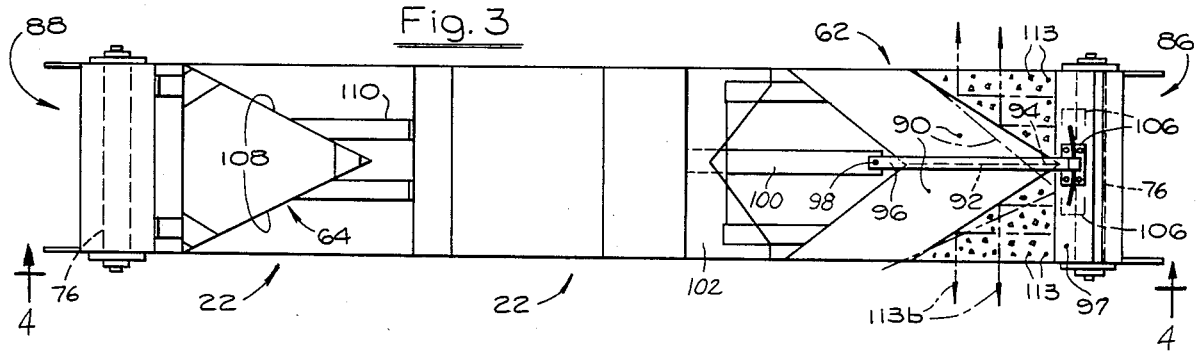
FIG. 3 is a plan view of the plow of the invention.
Figure 4:
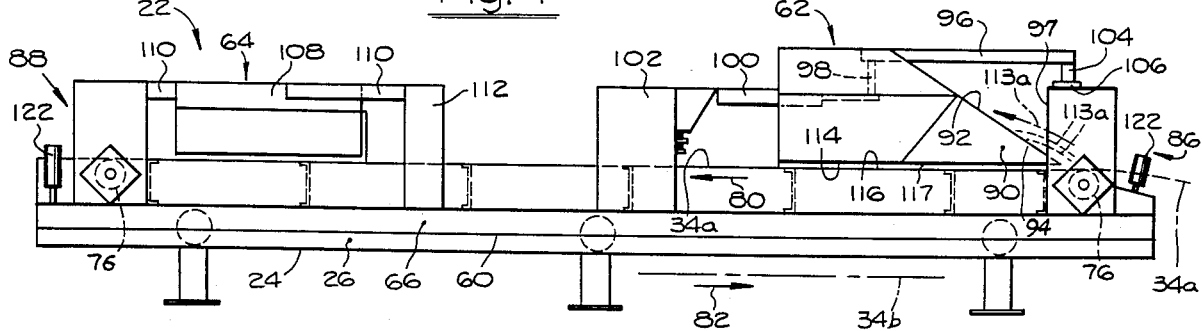
FIG. 4 is a side view of the plow.

For convenience in orienting the various elements, the endless belt has a normal direction of travel as indicated by the arrows 80, 82, the upper run thereby traveling from right to left as viewed in FIG. 8, this same orientation being indicated in FIG. 4. In carrying the grain into the granary, it is deposited on the upper belt 34a at a leading end, i.e., at the right hand end of FIG. 8, and it is carried into the plow. For convenience therefore the end of the plow into which the grain is carried indicated at 86, is designated the leading end or entry end, and the other end indicated at 88 is designated the trailing end or exit end (FIGS. 3, 4, 8).

The deflector 62 (FIGS. 3, 4) is located adjacent the leading end of the plow, this deflector including a pair of opposed blades 90, forming a ridge 92 therebetween and terminating in a point 94. The deflector is oriented with the point 94 toward the leading end, with the point positioned at or closely adjacent to the center of the end roll 76.

The blades 90 are supported by a longitudinal mounting bar 96, the front end of which is adjustably mounted on a cross piece 97 of the plow frame. The rear end of the mounting bar 96 is pivotally mounted by a pivot element 98 itself mounted on another mounting bar 100 leading rearwardly and supported by a suitable cross piece 102 of the plow frame.

The adjustable mounting of the bar 96 at its leading end includes a vertical element 104 mounted on a plate 106 resting on the cross piece 98. The plate 106 is mounted for adjustable positioning, transversely, for carrying the leading end of the mounting bar 96 in corresponding directions, to alternate positions shown in dot dash lines in FIG. 3. This positioning to the side,. correspondingly positions the point of the deflector blades to the respective side of the middle of the belt run, so as to deflect more or less of the grain on the belt to the respective side of the conveyor.

The wiper 64 as indicated above may be conventional and includes side diagonal deflector elements 108. This wiper component is mounted in a suitable manner such as by mounting elements 110 supported by cross pieces 112 of the plow frame.

Figure 7:
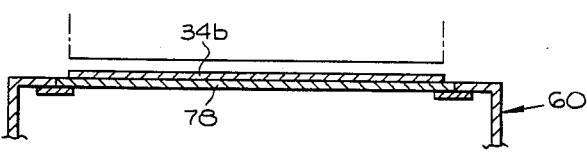
FIG. 7 is a fragmentary cross sectional view taken at a position between the ends of the plow frame.

In the use of the conveyor, the grain is placed on the conveyor, as indicated at 113 (FIGS. 3 and 4) and it is carried into the plow, and as the upper belt run leads up over the leading end roll 76, the grain is literally thrown onto the deflector blades, as at 113a, and thus deflected laterally, as at 113b to both sides. The upper belt run changes shape from the trough shape ahead of the plow to flat shape, as it moves over the end roll, and the bottom platform or slider belt 78 continues to hold the belt run flat (FIG. 7). The lower edges of the deflector blades 90, as indicated at 114 (FIG. 4) are spaced from the upper surface 116 of the upper belt run a minimum distance. FIG. 4 shows this space, 117, exaggerated. The deflector blades are positioned as close to the belt run as possible without producing a dragging effect. However, the spacing is small to effectively deflect substantially all of the grain from the belt. If any grain kernels should pass by the deflector they are wiped off by the wiper 64.

As indicated above, the main conveyor component 20 is operative for carrying the grain the desired distance, to where the plow is located, being thereby operative for carrying it throughout the full length of the granary. The plow is moved by the operator to the desired location, and then it remains stationary throughout the grain conveying operation, until it is again moved. The plow rides on the trougher rolls (FIG. 5) as explained above, through rails 72, 74. The means for so moving the plow includes a cable 118 (FIGS. 5, 8), in effect an endless cable, trained on pulleys 119 and. driven by a suitable power means 120. Also as stated above, in so moving the plow along the conveyor, the special guide rolls 50 (FIG. 6) are moved to lower position, enabling the plow to move thereover.

The plow is provided with upright guide rolls 122 (FIG. 4) at suitable location on the frame, engaging the side edges of the upper belt run in the travel of the belt run through the plow, guiding the belt and retaining it in proper position.

I claim:
1. Grain conveyor comprising,
  a main conveyor component including,
    a horizontal longitudinal main frame,
    an endless belt running longitudinally therein and including an upper run and a lower run,
    trougher rolls supporting the upper run,
  a plow including,
    a plow frame,
    longitudinal supporting rails bearing on the trougher rolls, and the trougher rolls thereby supporting the plow, and the plow being movable longitudinally along the main frame, the plow being adapted to have the upper run of the belt run therethrough and thereby carry grain on itself through the plow, and deflector means operable for deflecting grain laterally from the upper run of the belt, the trougher rolls including bottom rolls and inclined end rolls, and the longitudinal rails in the plow including inner rails positioned and arranged to bear on the trougher rolls at the juncture of the bottom rolls and end rolls respectively.

2. Grain conveyor according to claim 1 wherein, the outer rails are of downward concave shape receiving the convex edges at the upper end of the end rolls.

3. Grain conveyor according to claim 1 wherein, the inner rails have tapered end portions operable for guiding the rails into supporting position on the trougher rolls in response to movement of the plow along the main frame.

4. Grain conveyor comprising, a main conveyor component including, a horizontal longitudinal main frame, an endless belt running longitudinally therein and including an upper run and a lower run, trougher rolls supporting the upper run, a plow including, a plow frame, longitudinal supporting rails bearing on the trougher rolls, and the trougher rolls thereby supporting the plow, and the plow being movable longitudinally along the main frame, the plow being adapted to have the upper run of the belt run therethrough and thereby carry grain on itself through the plow, and deflector means operable for deflecting grain laterally from the upper run of the belt, upright guide rolls on the main frame normally positioned for guidingly engaging the side edges of the upper run of the belt, and means for mounting the guide rolls for swinging movement downwardly out of their normal position for enabling movement of the plow therepast, along the main frame.

* * * * *